Sept. 27, 1966     E. U. LANG ETAL     3,275,111
BAND CLUTCH WITH CUP SHAPED OUTER MEMBER
Filed June 26, 1964
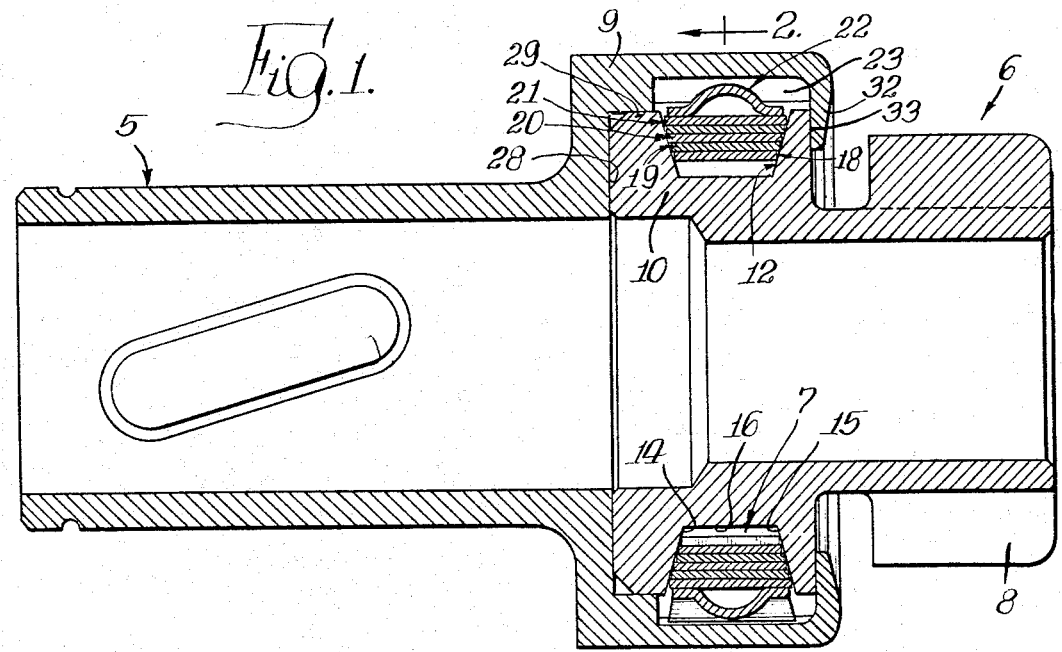
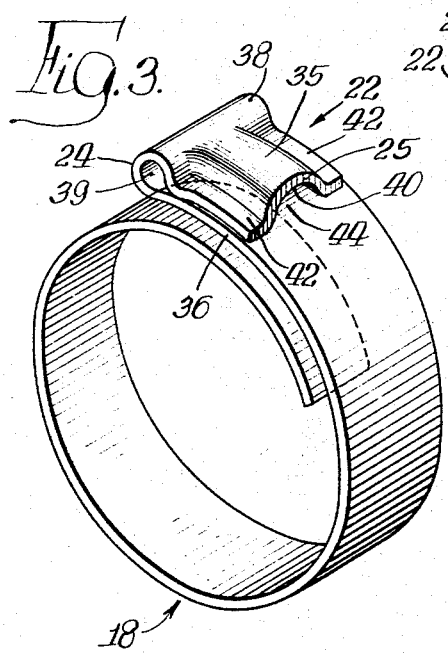
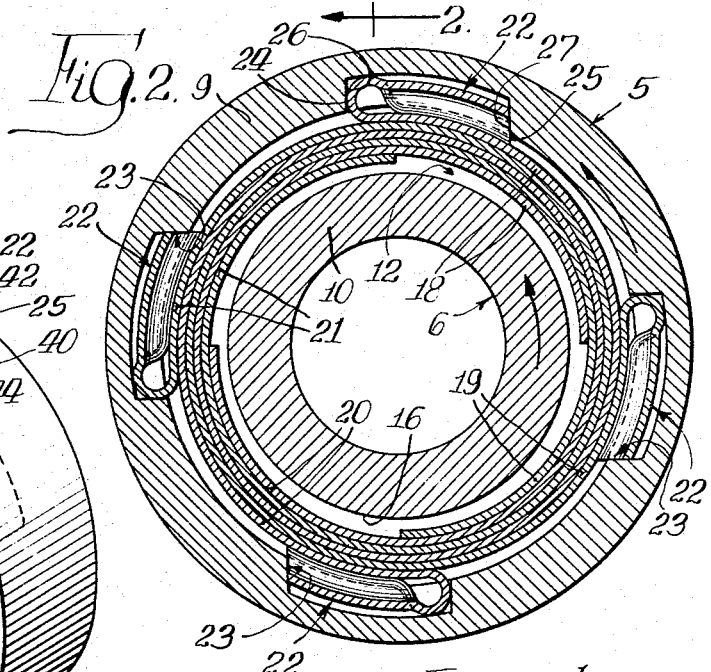
Inventors:—
Ernest U. Lang,
Edwin E. Mallory,
By Brown, Jackson, Boettcher
& Dienner
Attys.

United States Patent Office 3,275,111
Patented Sept. 27, 1966

3,275,111
BAND CLUTCH WITH CUP SHAPED OUTER MEMBER
Ernest U. Lang and Edwin E. Mallory, Niles, Mich., assignors to National-Standard Company, Niles, Mich., a corporation of Delaware
Filed June 26, 1964, Ser. No. 378,233
1 Claim. (Cl. 192—41)

The present invention relates to clutch constructions and more particularly to overrunning clutches.

Presently known overrunning clutches embody drive and driven members between which torque transmitting means of a wide variety of forms may be disposed with the arrangement being such that upon rotation of the drive member in one direction, the driven member is driven in the same direction through engagement of the torque transmitting means with the driven member, and which when the driven member rotates at a faster speed than the drive member, the torque transmitting means permits the driven member to overrun the drive member.

In clutch constructions of the aforegoing class, various components in addition to the drive and driven clutch members and torque transmitting means are required to retain the components assembled in a unitary and operative relation. For example, in many such clutches a separate housing member is assembled around one or both of the drive and driven clutch members and retaining means are provided between one or both of the clutch parts and housing to provide an assembled device which may be installed as a unit between drive and driven components of a machine to afford a desired one-way or overrunning relationship therebetween.

It is the purpose of the present invention to provide an overrunning clutch construction which in an operative unitary assembly thereof may be formed only of clutch drive and driven members and torque transmitting means therebetween.

Accordingly, it is an object of the present invention to provide an assembled or unitary clutch construction consisting essentially of drive and driven clutch members and torque transmitting means therebetween, and in which one of the clutch members serves additionally as an enclosure or housing for the clutch, and with the clutch members assembled in a novel manner with respect to each other to retain the torque transmitting means in assembled and operative relation with respect to the clutch members.

In order to achieve the foregoing object it is proposed to provide a unitary clutch assembly according to an exemplary embodiment of the invention which consists essentially of clutch drive and driven members disposed coaxially with respect to each other with the end of one clutch member in overlapping or telescoping relation with one end of the other clutch member, together with torque transmitting means between such overlapping or telescoping ends, and in which one of the clutch members has a portion thereof formed to engage the other of the clutch members to retain the clutch members together as a unit with the torque transmitting means in assembled operative relation therebetween.

In a preferred embodiment of the invention, the end of one clutch member may have a portion of generally cup-shaped configuration and within which one end of the other clutch member is disposed, and in which a flange formed integrally at the open end of the cup-shaped portion of the one clutch member engages with the other clutch member to retain the clutch members assembled in coaxial relation, and with the torque transmitting means assembled between such ends of the clutch members.

A preferred feature of the invention resides in providing a clutch construction as noted in which one of the clutch members is provided with a V-groove in which a known form of torque transmitting band means is disposed, and in which one end of such band means is fixed to the other of the clutch members.

The above and other objects and features of the invention will appear from the following detailed description of a preferred embodiment of the invention.

Now in order to acquaint those skilled in the art with the manner of constructing and utilizing clutches in accordance with the present invention, there is described below in connection with the accompanying drawing, a preferred embodiment of the invention.

In the drawing:

FIGURE 1 is a vertical sectional view through a clutch constructed in accordance with the present invention;

FIGURE 2 is a detail vertical sectional view taken substantially on the line 2—2 of FIGURE 1 looking in the direction indicated by the arrows, and FIGURE 3 is a perspective view of a clutch band of torque transmitting means suitable for use in the present invention.

Referring now to FIGURES 1 and 2 of the drawings, there is shown a clutch comprising drive and driven clutch members 5 and 6, respectively, which may have utility with automotive starter motors, and with which torque transmitting means in the form of band means, generally indicated at 7, of known construction may be embodied. The clutch band means may, for example, be like that shown and described in United States Patent No. 2,518,-453 issued August 15, 1954 to John M. Dodwell. It will be understood the present invention is not limited to clutch constructions for starter motors, but may be employed in any desired clutch arrangement embodying drive and driven clutch parts.

In the clutch shown in FIGURES 1 and 2 the clutch member 5 is of the form suitable for connection with an electric motor of a starter for the internal combusion engine of an automotive vehicle, and the clutch member 6 has a pinion portion 8 integral therewith for meshing engagement with a ring gear of a fly wheel of the engine of the vehicle. The drive member 5 is formed with an outer cup-shaped end portion 9 within which an inner end portion 10 of the driven clutch part 6 is disposed in telescoping or overlapping relation.

The inner end 10 of driven clutch member 6 is formed with a V-groove 12 defined by opposed end walls 14 and 15 and a bottom wall 16 for receiving clutch band means 7 which, in the embodiment of the invention shown, comprises four tapered bands 18, 19, 20 and 21 of generally spiral configuration, the terminal ends of greatest width having anchors 22 thereat and with their narrow free ends extending into the V-groove 12. The bands are preferably constructed of spring steel stock and effect a biasing force urging the side edges of the bands into wedging engagement with the walls 14 and 15 of V-groove 12. The anchors 22 fit into the pockets 23 formed by cutouts in the inner surface of the annular flange of the cup-shaped portion 9 of the drive member 5, and in the clutch shown in FIGURES 1 and 2, four of such pockets are disposed in uniform circumferentially spaced relation with respect to each other.

In that the several clutch bands 18 through 21 are of identical construction, reference hereinafter will be made only to band 18. As previously noted, the anchor end 22 of band 18 fits in pocket 23 of the drive member 5 and has a clutch release face 24 at its outer end and a clutch drive face 25 at its inner end, which faces 24 and 25 engage end walls 26 and 27, respectively, of the pocket 23.

It will be observed that the cup-shaped portion 9 is formed with an internal shoulder 28 with which the inner end 29 of end portion 10 of the clutch driven member 6 has bearing engagement.

The cup-shaped portion 9 at its open end is formed with an integral radially inwardly extending flange 32 which has bearing engagement with the outer end surface 33 of the inner end portion 10 of the clutch member 6. The inner end portion 10 of the driven clutch member 6 is thus retained within the cup-shaped portion 9 of the drive clutch member 5 with the end walls of the inner end 10 of clutch member 6 in bearing engagement with the internal shoulder 28 of clutch member 5 and the inner surface of the free edge portion of the radially inwardly extending flange 32.

In the clutch described, upon rotation of the drive member 5, in a counterclockwise direction, as indicated by the arrow, the end wall 27 of pocket 23 engages the drive face 25 of the anchor 22 which effects radial contraction of the band 18 to engage the side edges thereof with the walls 14 and 15 of the V-shaped groove 12 to drive the driven member 6 in a counterclockwise direction as indicated by the arrow applied to the latter. However, when the driven member 6 overruns the drive member 5 the releasing face 24 by its engagement with the end wall 26 of the pocket 23 effects release of the frictional driving engagement of the side edges of the band 18 with the walls 14 and 15 of the V-groove 12 to thus drivingly disengage the drive and driven clutch members. Thus, in the arrangement of the parts as shown, when the driven member 6 is rotating in the same direction but at a faster speed than the drive member 5, the driven member 6 overruns the drive member 5. The mode of operation of the clutch bands 18, 19, 20 and 21 in association with the drive and driven members of the clutch are further described in the aforementioned Dodwell patent and to which reference may be had. Also, in this regard, reference may be had to United States Patent No. 2,895,577 dated July 21, 1959 to John M. Dodwell for further discussion and explanation in the manner of effecting driving and overrunning of the clutch by torque transmitting means embodying bands as above described.

Further, the several clutch bands 18, 19 and 21 may be of the construction and form shown and described in the copending application of Edwin E. Mallory and Sidney L. Schell, Serial No. 369,419, filed May 22, 1964. As disclosed in the latter application and as shown in FIGURE 3, the clutch band 18 has the anchor 22 at the terminal end thereof of maximum width, and the band is curved in generally spiral form for assembly with drive and driven members 5 and 6 of the clutch. The anchor 22 comprises an outer end portion 35 disposed in superposed relation with respect to an adjacent inner end portion 36 and which outer and inner end portions are connected by a transverse end fold 38 of generally tubular configuration to define a transversely extending opening 39. The fold 38 is of a height in excess of twice the thickness of the metal from which the band is formed. The outer end portion 35 is of arcuate configuration in transverse cross-section, and is disposed with its concave surface 40 facing the opposed upper surface of the inner end portion 36. The side edges 42-42 of the outer end portion 35 are secured, as by brazing, adjacent and slightly inwardly of the side edges of the lower end portion 36 due to the taper of the band. The arcuate transverse configuration of the upper end portion 35 together with the lower end portion 36 define a channel 44 extending from the inner end or drive face 25 of the anchor 22 to the transverse opening 39 formed by the end fold 38. By reason of the end fold 38 and the arcuate transverse cross-section of the upper end portion 35 releasing and driving faces 24 and 25 of substantial height are provided. In the operation of the clutch and upon wear of the side edges of the spring bands in engaging the side walls 14 and 15 of the groove 12, the bands move radially inwardly of the V-groove 12, but the clutch release and drive faces being of substantial height as noted, accommodate substantial wearing away of the side faces of the bands without interfering with the operation of the clutch.

The aforegoing described clutch bands are exemplary of torque transmitting means which may be used with the clutch construction of the present invention, but it will be understood that other forms of torque transmitting and clutch band arrangements may be provided in an arrangement of drive and driven clutch members 5 and 6 as above described.

In constructing the clutch above described, the clutch members 5 and 6 are preferably formed of hardened steel stock and the drive clutch member 5 in its initial form has the integral flange 32 above described extending axially outwardly so as to define a fully open cup-shaped end portion. After assembly of the inner end portion 10 of clutch member 6 and the torque transmitting means 7 within the cup-shaped portion of clutch drive member 5 the outer end portion at the opening of the cup-shaped member 9 is then softened as by induction heating and then spun radially inwardly to define the radially inwardly extending flange 32 above described.

Thus, in the clutch above described, the cup-shaped end portion 9 of drive clutch member 5 provides bearing support for the end walls of the inner end portion 10 of the driven clutch member 6 with the radially inwardly extending flange 32 holding the clutch member in assembled relation with the torque transmitting means 7 in operative relation therebetween. The cup-shaped portion 9 of the drive member 5 also serves as a housing for the clutch. Thus, in accordance with the present invention, a unitary operative clutch is provided formed only of the clutch drive member 5, the clutch driven member 6 and the torque transmitting means 7 therebetween in the manner above related. It will be understood, of course, that the present invention only concerns the operative relation of the three noted essential components of a clutch and that the driven clutch member 6 may, for example, be provided with an internal bushing to provide a bearing support for association with a part of a machine with which the clutch is employed. Also, other components may be arranged as desired with the clutch as described, but that for purposes of the present invention, an operative unitary assembled clutch arrangement is provided which is formed only of the clutch drive and driven members 5 and 6, and torque transmitting means 7, and in the appended claim the term "consisting essentially of" is to be construed in the manner above discussed.

While a preferred form of the invention has been shown and described, it will be apparent that revisions and modifications may be made therein without departing from the spirit and scope of the invention.

The invention claimed is:

A unitary clutch assembly consisting essentially of outer and inner clutch members, said outer clutch member having a cup-shaped portion of hardened steel stock at one end thereof, said cup-shaped portion having an annular internal shoulder at its inner end, said inner clutch member having one end thereof disposed coaxially of the axis of said cup-shaped portion and in telescoping relation thereto, said one end of said inner clutch member being of hardened steel stock having bearing surfaces at its inner end in bearing engagement with said annular internal shoulder of said cup-shaped portion, one-way torque transmitting means between said one ends of said clutch members, and flange means integral with but softer than said cup-shaped portion at the open end thereof extending radially inwardly toward and having bearing engagement with the outer end of said inner clutch member to retain said clutch members assembled in coaxial relation with respect to each other and with said torque transmitting means in assembled relation therebetween.

References Cited by the Examiner

UNITED STATES PATENTS

| | | | |
|---|---|---|---|
| 2,203,805 | 6/1940 | Wiggs | 192—45 |
| 2,518,453 | 8/1950 | Dodwell | 192—41 |
| 2,548,747 | 4/1951 | Starky | 192—41 |
| 2,707,038 | 4/1955 | Szady | 192—41 |
| 2,895,577 | 7/1959 | Dodwell | 192—81 |
| 2,928,514 | 3/1960 | Clausing et al. | 192—81 |
| 3,117,660 | 1/1964 | Dodwell | 192—41 |

DAVID J. WILLIAMOWSKY, *Primary Examiner.*